United States Patent
Vogel et al.

(10) Patent No.: US 7,765,980 B2
(45) Date of Patent: Aug. 3, 2010

(54) INTERNAL COMBUSTION ENGINE AND METHOD FOR OPERATING AN INTERNAL COMBUSTION ENGINE BY MEANS OF A LASER IGNITION UNIT

(75) Inventors: Manfred Vogel, Ditzingen (DE); Werner Herden, Gerlingen (DE); Heiko Ridderbusch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 12/094,193

(22) PCT Filed: Sep. 26, 2006

(86) PCT No.: PCT/EP2006/066747
§ 371 (c)(1),
(2), (4) Date: May 19, 2008

(87) PCT Pub. No.: WO2007/060046
PCT Pub. Date: May 31, 2007

(65) Prior Publication Data
US 2008/0257294 A1    Oct. 23, 2008

(30) Foreign Application Priority Data
Nov. 28, 2005    (DE) .................. 10 2005 056 520

(51) Int. Cl.
*F02P 23/04* (2006.01)
(52) U.S. Cl. .................. 123/305; 123/143 B
(58) Field of Classification Search .......... 123/305, 123/143 B
See application file for complete search history.

(56) References Cited

U.S. PATENT DOCUMENTS

| | | | | |
|---|---|---|---|---|
| 2004/0216712 A1* | 11/2004 | Herdin et al. | ........... | 123/143 B |
| 2005/0224041 A1* | 10/2005 | Herrmann et al. | ........... | 123/295 |
| 2008/0264371 A1* | 10/2008 | Taido et al. | ............. | 123/143 B |
| 2009/0133655 A1* | 5/2009 | Inohara et al. | .......... | 123/143 B |
| 2009/0159033 A1* | 6/2009 | Steigleman et al. | ..... | 123/143 B |

FOREIGN PATENT DOCUMENTS

| | | |
|---|---|---|
| DE | 10 2004 053 493 A1 | 5/2006 |
| EP | 0 853 188 A1 | 7/1998 |
| EP | 1 277 942 A2 | 1/2003 |
| JP | 55-87861 | 7/1980 |
| JP | 1-193081 | 8/1989 |
| WO | WO 02/095220 A1 | 11/2002 |
| WO | WO 2005/078256 A2 | 8/2005 |
| WO | WO 2005/080788 A1 | 9/2005 |

* cited by examiner

*Primary Examiner*—Erick Solis
(74) *Attorney, Agent, or Firm*—Ronald E. Greigg

(57) ABSTRACT

The invention relates to a method for operating an internal combustion engine including a fuel-injection unit and a laser ignition-unit. According to the invention, during a compression cycle of the internal combustion engine, fuel is injected into the combustion chamber by means of the fuel-injection unit in such a way that an ignitable, round, flat mixed region of fuel and air forms on a plunger and a predetermined period elapses between the end of the fuel injection and the start of ignition in order to form the round flat mixed region. Ignition then takes place within the flat round mixed region by means of the laser-ignition unit.

24 Claims, 7 Drawing Sheets

Approximately 20° Before TDC

Approximately 20° Before TDC

Approximately 35° Before TDC

Approximately 20° Before TDC

Approximately 35° Before TDC

Approximately 20° Before TDC

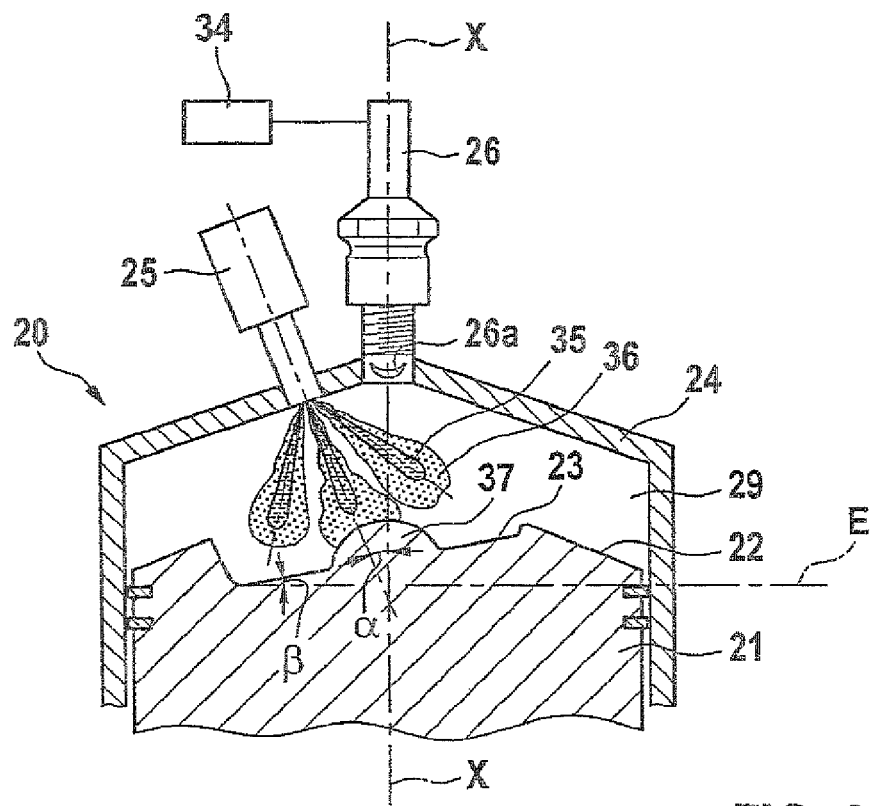
Approximately 35° Before TDC   FIG. 9
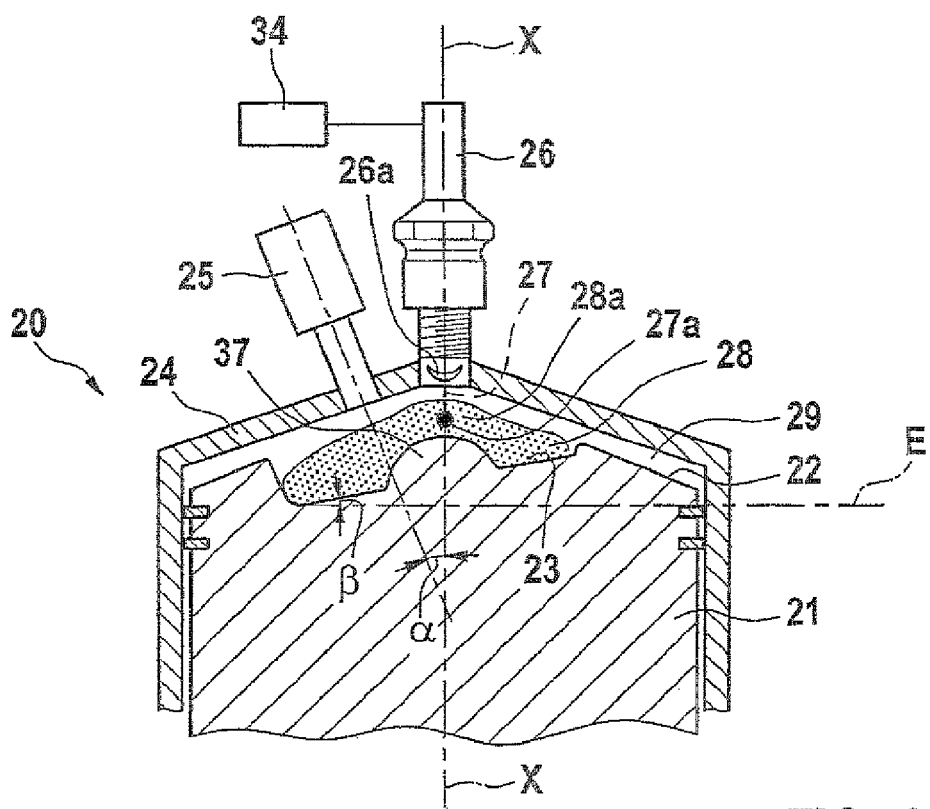
Approximately 20° Before TDC   FIG. 10

Approximately 20° Before TDC

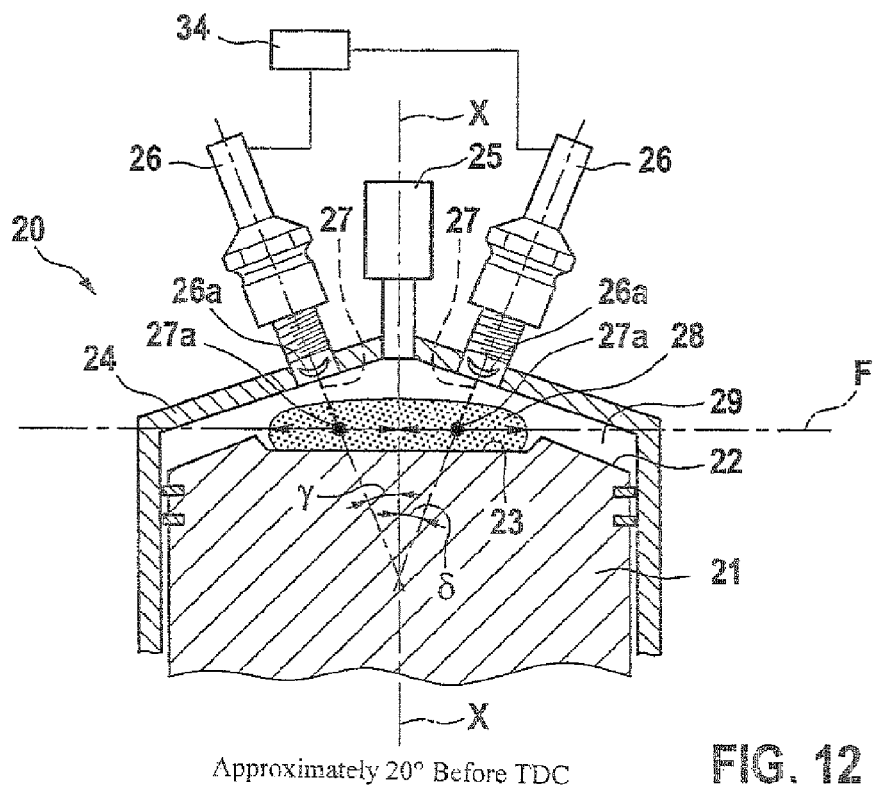
Approximately 20° Before TDC
FIG. 12
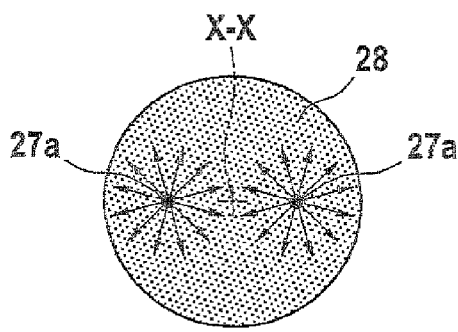
FIG. 13
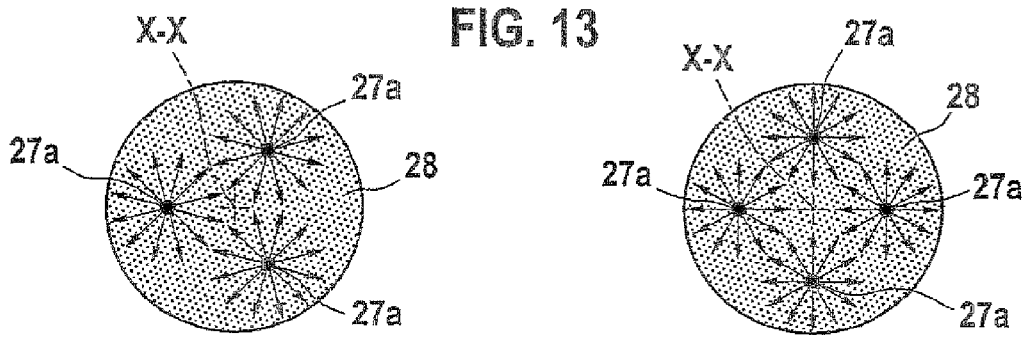
FIG. 14a      FIG. 14b

INTERNAL COMBUSTION ENGINE AND METHOD FOR OPERATING AN INTERNAL COMBUSTION ENGINE BY MEANS OF A LASER IGNITION UNIT

CROSS-REFERNCE TO RELATED APPLICATION

This application is a 35 USC 371 application of PCT/EP2006/066747 filed on Sep. 26, 2006

BACKGROUND OF THE INVENTION

1. Field of the Invention

The present invention relates to an internal combustion engine having a laser ignition device for direct gasoline injection, and to a method for operating such an engine.

2. Description of the Prior Art

Internal combustion engines for direct gasoline injection are known in various designs from the prior art. Such engines are lately used more and more, since they have lower fuel consumption and low emissions. A common feature of the known engines is that they typically have an injection valve in a central position and a spark plug disposed in such a way that they are located on a periphery of the spray of fuel injected into the combustion chamber. The ignition of the fuel, which propagates essentially conically from the injection valve, is effected at the periphery of the cone, since only there is an ignitable fuel-air mixture present. In practice, however, in positioning the spark site of the spark plug, problems arise in positioning this spark site precisely in the narrow peripheral zone in the region of the ignitable fuel-air mixture. This is due on the one hand to component tolerances of the injection valve, spark plug, and cylinder head, and on the other to the deviation in the spray geometry from one cycle to another, and thus the ignitable peripheral zone can vary to a certain extent. Cyclical deviations in the spark site within the electrode region can also occur in the spark plug, and the spray geometry can vary from aging because of deposits or as a function of the engine performance graph. These factors lead to reduced efficiency on the one hand and to problems with the exhaust gases on the other.

Moreover, it has lately been proposed that the conventional spark plug be replaced by a laser ignition device, with ignition again taking place at the periphery of an injected fuel vapor cloud.

SUMMARY AND ADVANTAGES OF THE INVENTION

The method according to the invention for operating an internal combustion engine has the advantage over the prior art that reliable ignition can always be assured. Moreover, the efficiency is increased according to the invention, which results in fuel economy and improved exhaust emissions. This is attained according to the invention in that fuel is injected into a combustion chamber during a compression cycle of the engine. The fuel is injected into the combustion chamber in such a way that an ignitable patty-shaped mixture region comprising fuel and air forms on the piston. The patty-shaped mixture region rests on the bottom face of the piston. According to the invention, between an end of the fuel injection and a beginning of an ignition with a laser ignition device, a predetermined period of time elapses, to enable the formation of the patty-shaped mixture region on the piston. The period of time is selected such that an ignition site of a laser beam of the laser ignition device, aimed into the combustion chamber, is located in the interior of the ignitable patty-shaped mixture region. As a result, ignition occurs first inside the patty- shaped mixture region. According to the invention, ignition therefore no longer occurs at the periphery of a vapor cloud of injected fuel, but rather in the interior of a patty-shaped mixture region located on the piston. After the injection, there is a wait until the patty-shaped mixture region has formed on the piston which during the compression phase moves counter to the injection direction of the fuel. When the fuel injected into the combustion chamber is injected in the form of a stream that with increasing penetration depth into the combustion chamber increasingly vaporizes, the stream, particularly in the region of the point of the spray, produces an ignitable envelope of a gaseous fuel-air mixture, which wraps like a ruff around a center of the stream. This gaseous envelope is essentially in the form of a teardrop. Because the piston is moving counter to the thus-injected fuel, the piston deflects the fuel-air mixture horizontally to all sides, which leads to further mixing from turbulence. As a result, the ignitable patty-shaped mixture region according to the invention is formed on the piston bottom. Thus during the period of time after the injection and before the ignition, the mixture region of the invention is formed on the piston. The patty-shaped mixture region is surrounded by a non-ignitable gas mixture, especially air. In the process, the piston continues moving upward in the direction of the cylinder head, and ignition does not occur until the focal point of the laser is located in the interior of the mixture region. Since the ignition is thus generated in the interior of the mixture region, reliable ignition can be made possible. Moreover, beginning at the ignition site, the flame travels to the edge of the mixture region are markedly shorter than in comparison with an ignition point at a periphery, so that faster combustion is attained as well. The use of a laser ignition device makes it possible for ignition to take place at any arbitrary point in the mixture region. When conventional spark plugs are used, only spark locations that reach approximately 8 mm into the combustion chamber are possible, since otherwise the electrodes and ceramic of the spark plugs become too hot. In contrast to this, using the laser ignition device can be done at the periphery of a combustion chamber, without part of it protruding into the combustion chamber. Moreover, a laser ignition device has no ignition energy losses from quenching phenomena (heat dissipation) at metal spark plug electrodes. As a result, cyclical fluctuations in the course of combustion are reduced, since the laser ignition device makes high replicability of the sensitive flame core formation possible. Also by means of the laser ignition device, even dilute mixtures can be ignited. Moreover, ignition in the interior of the mixture region enables faster combustion of the entire mixture region, which can be utilized thermodynamically by enabling either a faster course of combustion (higher compression without knocking, resulting in better fuel economy) and/or mixture dilution (leaning down or exhaust gas recirculation, which thus reduces NOx and has advantages in terms of better combustion).

The injection of the fuel is effected preferably by means of a multiplicity of individual streams, which are generated by means of a multi-port valve having preferably between seven and fourteen ports, or by means of an outward-opening annular gap valve (A valve) with an opening angle α of between $70° \leq \alpha \leq 110°$.

Preferably, the period of time between the end of the fuel injection and the beginning of the ignition is selected such that it corresponds to a crankshaft angle travel of between 5° and 15°, in particular between 5° and 10°, and especially preferably 7.5°.

To enable faster and more reliable formation of the patty-shaped mixture region, a hollow, in which the patty-shaped mixture region forms, is preferably provided in the piston bottom. The hollow is preferably circular and symmetrical.

Especially preferably, ignition occurs near or at a middle region of the patty-shaped mixture region, so as to have the shortest possible flame travels through the entire mixture region.

Also preferably, a protruding nub over which the patty-shaped mixture region lies is formed on the piston bottom, so as to form a region that protrudes essentially in the axial direction of the piston in the patty-shaped mixture region. The ignition of the patty-shaped mixture region can preferably be effected beginning at the protruding region. As a result, it can be attained that the onset of the ignition of the patty-shaped mixture region takes place at an even earlier motion segment in the direction of top dead center of the piston, so that precisely in the optimal crankshaft angle range for efficiency, the most complete possible combustion of the patty-shaped mixture region takes place, and the expansion cycle then follows. To achieve positioning of the injection valve as centrally as possible in the cylinder head, the protruding nub is preferably disposed on a periphery of the hollow on the piston bottom. To achieve faster formation of the patty-shaped mixture region, a fuel injection is preferably effected at the nub that protrudes from the piston bottom.

Preferably, the fuel injection takes place in a plurality of successive intervals. As a result, a higher proportion of air is present in the patty-shaped mixture region, since between the individual intervals of the fuel injection, there is a small air cushion each time.

To keep the flame transit times from an ignition site through the patty-shaped mixture region as short as possible, a multiplicity of ignition sites is preferably provided in the interior of the mixture region. The multiplicity of ignition sites can be generated by means of a plurality of laser ignition devices or by means of one laser ignition device which is actuated multiple times at different focal points. The multiplicity of ignition sites is preferably disposed symmetrically in the patty-shaped mixture region. The multiplicity of ignition sites is preferably located in one plane, to achieve the most homogeneous possible flame transit time through the mixture region. However, it should be noted that depending on the given geometrical conditions at the piston and/or of the combustion chamber, the multiplicity of ignition sites may also be disposed in different planes.

To enable load-dependent ignition, for instance, in a simple way, the focal length of the laser ignition device is preferably variable. As a result, the laser ignition device can be adapted to different ambient conditions.

In order in particular to attain reduced noise upon ignition of the patty-shaped mixture region at a plurality of ignition sites, the various ignition sites are preferably ignited at different instants. This makes further optimization of the course of combustion possible.

The method according to the invention is preferably employed in a stratified-charge mode of the engine. The term stratified-charge mode is understood here to mean a mode of operation in which only slight loads are placed on the engine. In the stratified-charge mode, combustion in the combustion chamber is defined essentially only by the fuel mass injected, and a throttle valve is typically opened wide. However, the method of the invention can also be employed in the normal operating mode of the engine.

In addition, according to the invention, an internal combustion engine for direct injection of fuel into a combustion chamber is proposed that includes a laser ignition device, a piston, and a fuel injection device. The engine moreover includes a control unit for determining an instant of ignition of the laser ignition device. The control unit does not activate the laser ignition device until the fuel injection operation has concluded, and an ignitable patty-shaped mixture region has formed on the piston. In other words, between the end of the fuel injection event and the onset of ignition, a predetermined period of time elapses, on the one hand to enable the formation of the patty-shaped mixture region and on the other so as not to perform an ignition until a focal point (ignition site) of the laser is located in the patty-shaped mixture region. It is thus assured that the mixture region is ignited in its interior, and hence the flame travels are very short.

The control unit determines the instant of ignition preferably as a function of a piston position. The position of the piston can preferably be determined from a crankshaft angle by means of a sensor.

To reinforce the formation of the ignitable patty-shaped mixture region, the piston preferably has a substantially circular hollow on a piston bottom face. The hollow is preferably symmetrical to a center axis of the piston.

Also preferably, the piston has a protruding nub on the piston bottom face. The nub may preferably be provided in a circular hollow, or on the periphery of the hollow. By means of the protruding nub in the region of the hollow, it can be assured that the patty-shaped mixture region forms above the nub as well, so that one region of the mixture region protrudes in the direction of motion of the piston. The laser ignition device is then preferably disposed in such a way that the focal point of the laser is located in the protruding region of the mixture region. As a result, ignition long before top dead center of the piston can for instance be attained, yet the ignition still reliably takes place in the interior of the mixture region.

In a further preferred feature of the invention, the hollow formed on the piston bottom face has a basic face inclined at an angle to the center axis of the piston. This makes it possible to dispose the laser ignition device centrally in the cylinder head and nevertheless to enable a fuel injection perpendicularly to the piston bottom. The central disposition of the laser ignition device has advantages in terms of installation space as well.

Preferably, the laser ignition device includes a focusable lens, for varying a position of the focal point of the laser beam.

To make a multiplicity of ignition sites in the patty-shaped mixture region possible, the engine preferably includes a multiplicity of laser ignition devices. The multiplicity of laser ignition devices are preferably disposed such that the ignition sites are disposed as symmetrically as possible in the patty-shaped mixture region. The control unit actuates the multiplicity of laser ignition devices preferably at different instants, to enable optimizing a desired course of combustion, in particular with regard to noise and to the flame transit times through the mixture region.

The fuel injection device is preferably a multi-port valve having a number of ports ranging between seven and fourteen, or an outward-opening annular gap valve (A-valve), preferably with an opening angle of between 70° and 110°.

BRIEF DESCRIPTION OF THE DRAWINGS

Preferred exemplary embodiments of the invention are described below in detail in conjunction with the drawings. In the drawings:

FIGS. 9 and 10 are schematic sectional views of an internal combustion engine in a fourth exemplary embodiment of the present invention;

FIG. 12 is a schematic sectional view of an internal combustion engine in a sixth exemplary embodiment of the present invention; and FIG. 13 is a plan view on the patty-shaped mixture region of FIG. 12; and FIGS. 14a and 14b are plan views of patty-shaped mixture regions with different ignition sites.

DESCRIPTION OF THE PREFERRED EMBODIMENTS

An internal combustion engine 20 in a first exemplary embodiment of the invention will now be described in conjunction with FIGS. 1 and 2.

Figure 1:
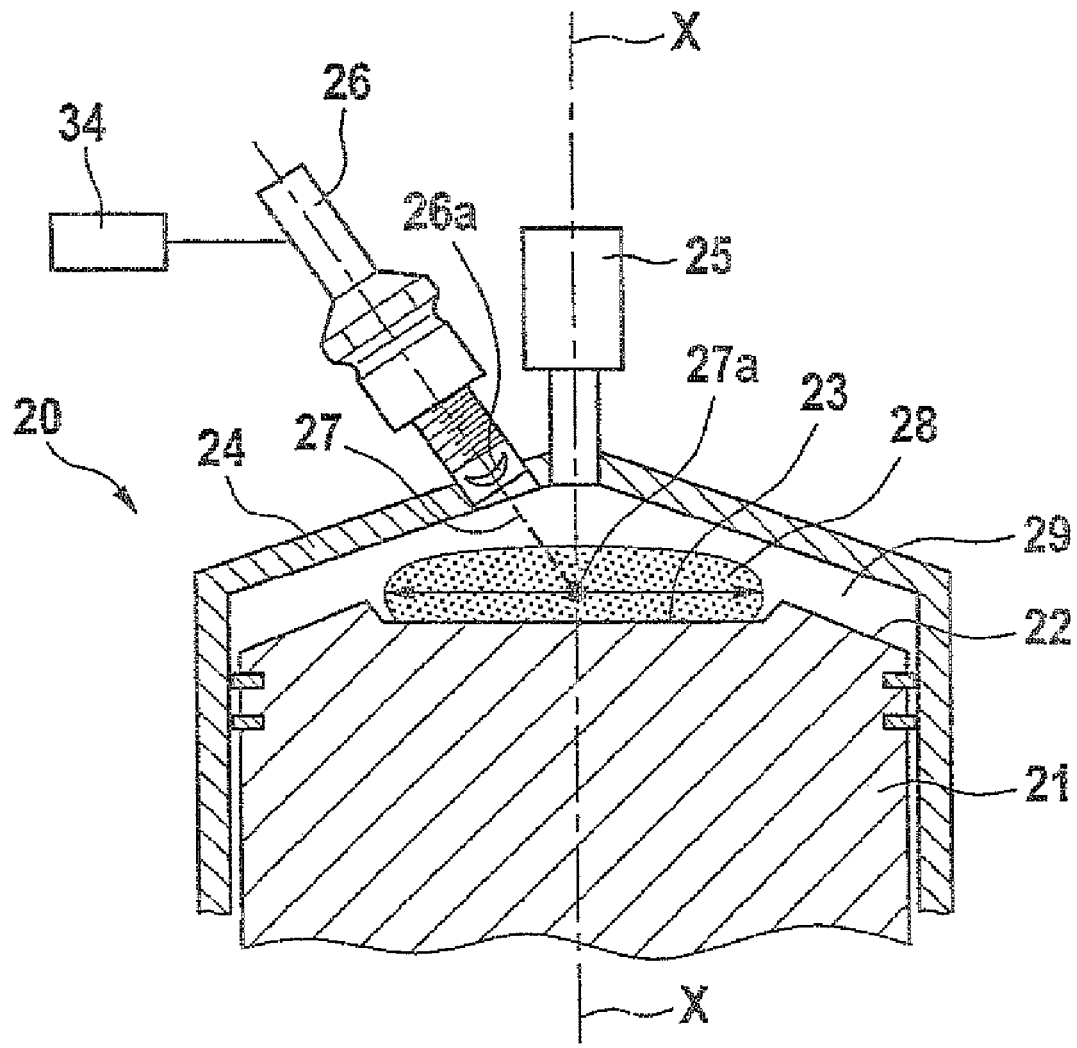
FIG. 1 is a schematic sectional view of an internal combustion engine, in a first exemplary embodiment of the invention.

As shown in FIG. 1, the internal combustion engine 20 includes a piston 21, with a piston bottom 22 in which a circular hollow 23 is disposed centrally and symmetrically to a center axis X-X of the piston. The piston 21 moves in a cylinder in the known manner; an injection device 25 and a laser ignition device 26 are disposed in a cylinder head 24. The injection device 25 is disposed centrally in the cylinder head on the center axis X-X of the piston and in this exemplary embodiment, it is a multi-port valve with ten ports. The disposition of the ports can be seen in FIG. 2a. The laser ignition device 26 is controlled via a control unit 34 and has an aspherical lens 26a. The laser ignition device further includes a quality-switched optically pumped solid-state laser. The laser ignition device 26 generates a laser beam 27, which is aimed into a combustion chamber 29. The laser ignition device 26 is formed in planar fashion toward the inner wall of the cylinder head 24, so that the laser ignition device 26 does not protrude into the combustion chamber 29.

Figure 2A:
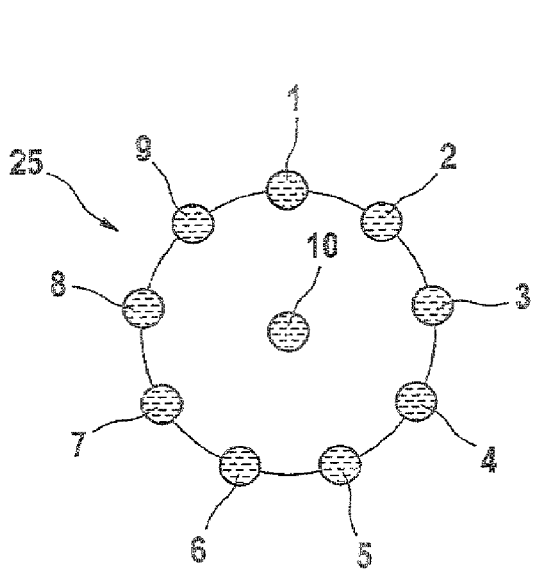
FIGS. 2a and 2b are schematic illustrations of the injection of fuel by means of a multi-port valve.
Figure 2B:
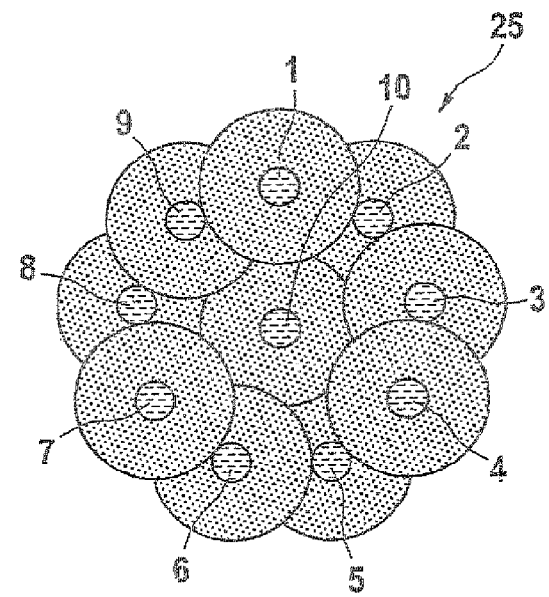

From FIGS. 2a and 2b, the injection of the fuel into the combustion chamber 29 becomes clear. The individual streams, identified by reference numerals 1 through 10, of the injection device 25 are injected into the combustion chamber in the direction of the oncoming piston. With increasing penetration depth of each individual stream, increasing vaporization occurs, so that an envelope of a gaseous fuel-air mixture is generated around each injection stream 1 through 10, especially in the region of the spray point of the injected fuel. This is indicated in FIG. 2b by the large circles around each individual stream 1 through 10. The gaseous fuel-air mixture envelope wraps around the stream in the manner of a ruff, and the point of the stream is also formed by a gaseous fuel-air mixture. As can also be seen from FIG. 2b, the fuel-air mixture envelopes of the individual streams are partially superimposed on one another because of turbulence and because the piston 21 is moving counter to the stream direction and deflects the fuel-air mixture envelope horizontally. As a result, an ignitable patty-shaped mixture region 28 forms on the piston bottom 22. The formation of the patty-shaped mixture region 28 is still further reinforced by the hollow 23 provided in the piston bottom 22. The patty-shaped mixture region 28 has a circular shape, with a thickness that decreases somewhat from the center toward the outer periphery. The mixture region 28 is a substantially homogeneous gaseous fuel-air mixture, which has a mean lambda value of between 0.8 and 1.5.

According to the invention, the injection of fuel is effected at a crankshaft angle of approximately 35° before top dead center OT. The ports in the multi-port valve should be designed such that each individual stream has a shape that is as bushy as possible. For that purpose, the diameter of an individual port is preferably between approximately 130 μm and 200 μm. Also preferably, tapering and in particular conical, outward-opening ports or graduated ports are favorable to a bushy spray shape with the desired fuel-air mixture gas envelopes. As shown in FIG. 2a, the beam axes of the ports in the multi-port valve are selected such that they have approximately the same dihedral angle spacing.

It should be noted that depending on a distance traveled by an individual stream to the piston bottom, the diameter of the individual ports may vary. Inner streams, which given the central disposition of the injection device shown in FIG. 1 have the shortest distance to the piston, can have a smaller port diameter than the ports located on the circumference. Through the smaller ports, the fuel quantity passing through them, and thus the spray impetus, become less, so that the inner streams as well are reliably vaporized before they reach the piston bottom 22. The choice of the port diameter and the opening angle of the injection ports and of the number of ports should be made such that the injected fuel has just vaporized when it reaches the piston bottom 22. As a result, the oncoming piston can furnish especially good mixing and homogenizing of the ignitable mixture region 28.

The formation of the mixture region 28 takes place in a range of between 35° before top dead center and approximately 20° before top dead center. FIG. 1 shows the position approximately 20° before top dead center, in which the mixture region 28 has formed homogeneously in the hollow 23 on the piston bottom. However, ignition by means of the laser ignition device 26 does not take place until a focal point of the laser 27 is located in the interior of the mixture region 28. This focal point defines the ignition site 27a in the interior of the mixture region. This exists at a piston position of approximately 20° before top dead center, as shown in FIG. 1, with the ignition site 27a located precisely on the center axis X-X.

The control unit 34 controls the instant of ignition of the laser ignition device 26 as a function of the position of the piston 21. Preferably, the instant of ignition is located at a crankshaft angle of approximately 20° before top dead center. It can thus be assured that the mixture region 28 combusts completely in the crankshaft angle range that is optimal in terms of efficiency, and high efficiency of the engine is achieved. A period of time between an end of the fuel injection and the onset of ignition corresponds to a distance traveled by the piston over a crankshaft angle of between 5° and 10°, preferably 7.5°.

As a result of the ignition in the interior of the mixture region 28, the flame travels through the mixture region 28 are reduced markedly, compared to ignition at the periphery. Hence on the one hand faster and also more-complete combustion can be attained. On the other, as a result an especially stable combustion process is also attained, especially in the stratified-charge mode of the engine. The patty-shaped mixture region 28 is due according to the invention to the interaction of the fuel being injected and of the piston, and a certain period of time elapses between the end of injection and the onset of ignition, so as to enable the formation of the mixture region and to perform ignition of the mixture region 28 in its interior. Also as a result of the ignition in the interior, the deviations that occur from component tolerances do not lead to uneven combustion. Deviations in the spray geometry from one cycle to the next, or performance-graph-dependent fluctuations in the spray geometry, have no influence on the method of the invention, either. The laser ignition device furthermore has the advantage that no ignition energy losses from quenching phenomena (heat dissipation) at metal spark plug electrodes occur, as they do in the prior art. Hence in an Otto engine, high replicability of the sensitive flame core formation is made possible for the first time.

Figure 3:
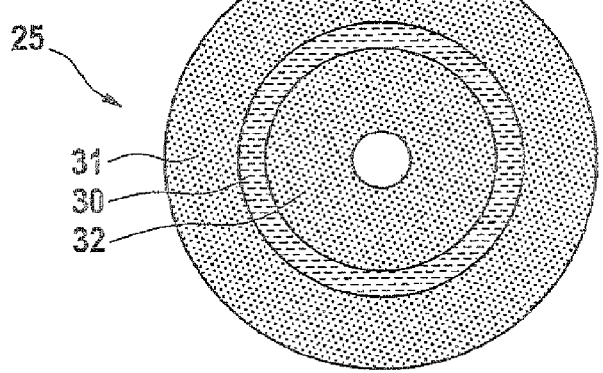
FIG. 3 is a schematic illustration of a spray cloud of an outward-opening annular gap valve (A-valve)

FIG. 3 shows an alternative embodiment of an injection device 25, in the form of an outward-opening annular gap valve (A-valve). The annular gap valve shown injects the fuel in conical shape, so that in the sectional view shown in FIG. 3, an annular fuel region 30 is brought about. On each side of the fuel region 30, a respective envelope 31 and 32 of fuel-air mixture forms. An opening angle of the annular gap valve of FIG. 3 is preferably between 70° and 110°. Because of the injection by means of the annular gap valve, a homogeneous, patty-shaped mixture region 28 on the piston is likewise generated as in FIG. 1, and the piston deflects the arriving fuel-air mixture horizontally both inward and outward.

Figure 4A:
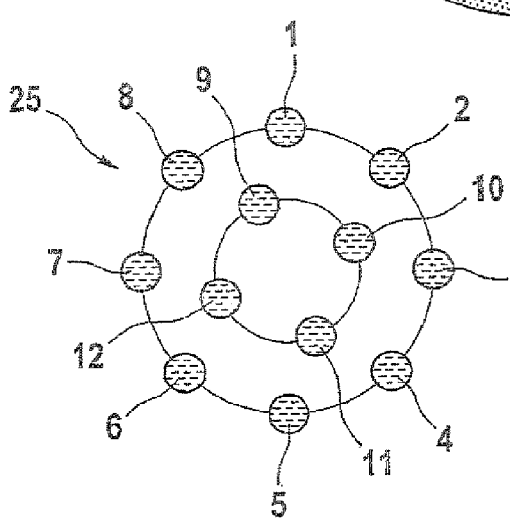
FIGS. 4a and 4b are schematic views of an injection by means of a multi-port valve in a further exemplary embodiment of the invention.
Figure 4B:
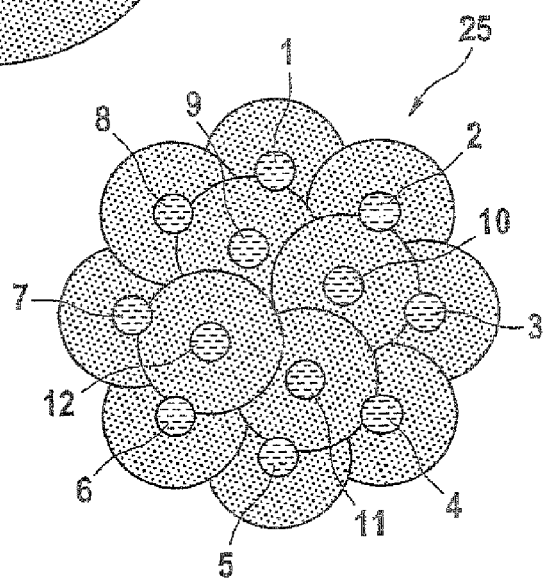

FIGS. 4a and 4b show a further embodiment of an injection device 25, which again is embodied as a multi-port valve. The multi-port valve shown in FIGS. 4a and 4b has twelve injection ports 1 through 12. The injection ports are distributed along two concentric circles and are offset from one another on these circles. The result is the spray distribution around the individual streams as shown in FIG. 4b. The large circles again represent the gaseous mixture envelopes. Otherwise, this exemplary embodiment is equivalent to the first exemplary embodiment so that the description thereof may be referred to.

Figure 5:
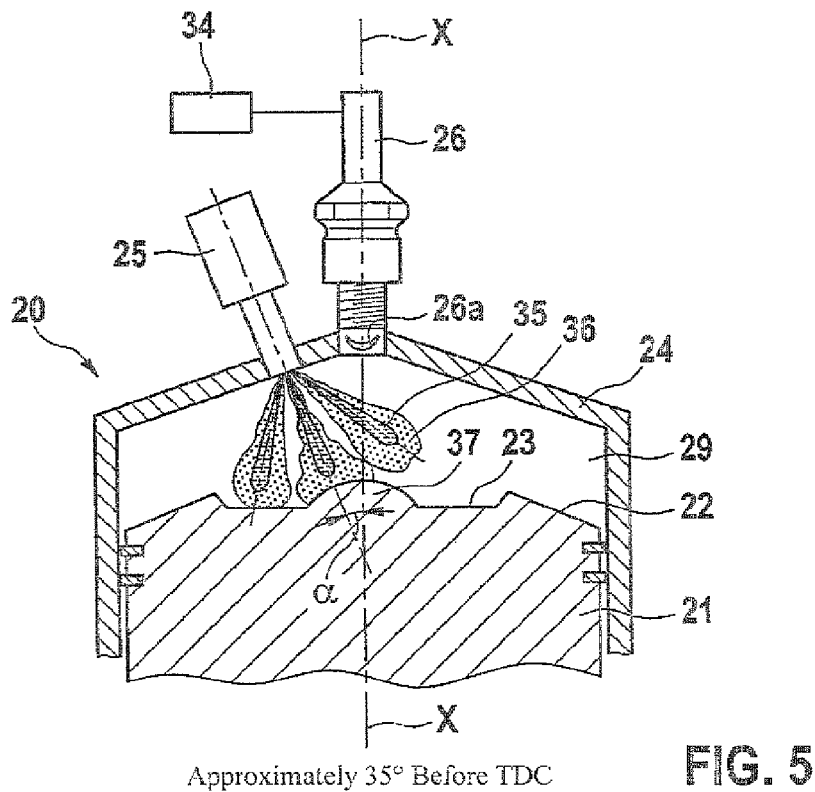
FIGS. 5 and 6 are schematic sectional views of an internal combustion engine in a second exemplary embodiment of the invention.
Figure 6:
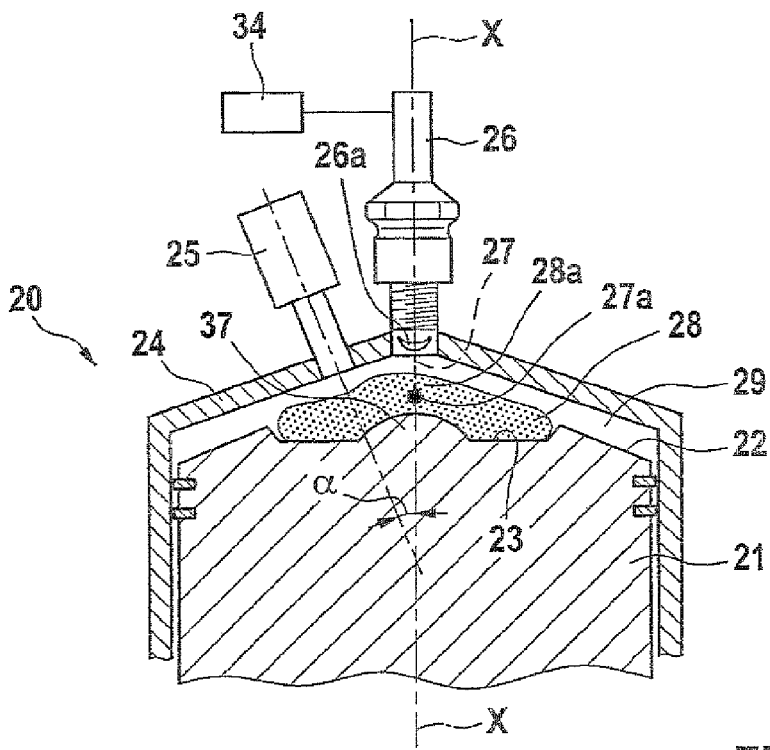

In FIGS. 5 and 6, an internal combustion engine 20 is shown in a second exemplary embodiment of the invention, in which identical or functionally identical parts are identified by the same reference numerals. Unlike the first exemplary embodiment, in the engine 20 of the second exemplary embodiment, the laser ignition device 26 is disposed centrally on the center axis X-X. The injection device 25 is disposed laterally of the laser ignition device 26 and at an angle α to the center axis. Once again, the injection device 25 is a multi-port valve; in FIG. 5, three injection streams, with a still-liquid fuel stream 35 and a developing gaseous envelope 36 comprising a fuel-air mixture, are shown schematically. When the individual streams strike the piston bottom 22, they are completely vaporized, so that only a gaseous fuel-air mixture strikes the piston bottom. As can also be seen from FIG. 5, a protruding nub 37 is also formed in the hollow 23 formed in the piston bottom 22. The protruding nub 37 is disposed centrally in the hollow 23, on the center axis X-X, and essentially has the shape of a segment of a sphere. The injection of fuel takes place precisely in the direction of the protruding nub 37. As shown in FIG. 5, the piston position at the onset of injection is approximately 35° before top dead center. Once the fuel injection is concluded, the piston 21 moves onward in the direction toward the laser ignition device 26, and then as a result of the deflection at the piston bottom, the homogeneous, ignitable mixture region 28 forms (see FIG. 6). Here, the mixture region 28 is also formed above the protruding nub 37, so that as shown in FIG. 6, an ignition site 27a is located in a protruding region 28a of the mixture region 28, at a piston position of approximately 20° before top dead center. The position of the piston as shown in FIG. 6 is the position in which the ignition of the mixture region 28 takes place. Since in this exemplary embodiment, the laser ignition device 26 is disposed centrally on the center axis X-X, and the center axis X-X is also an axis of symmetry for the mixture region 28, the flame travels from the ignition site 27a to the peripheries of the mixture region 28 are especially short in this exemplary embodiment. As a result, especially fast, complete combustion can be achieved.

Figure 7:
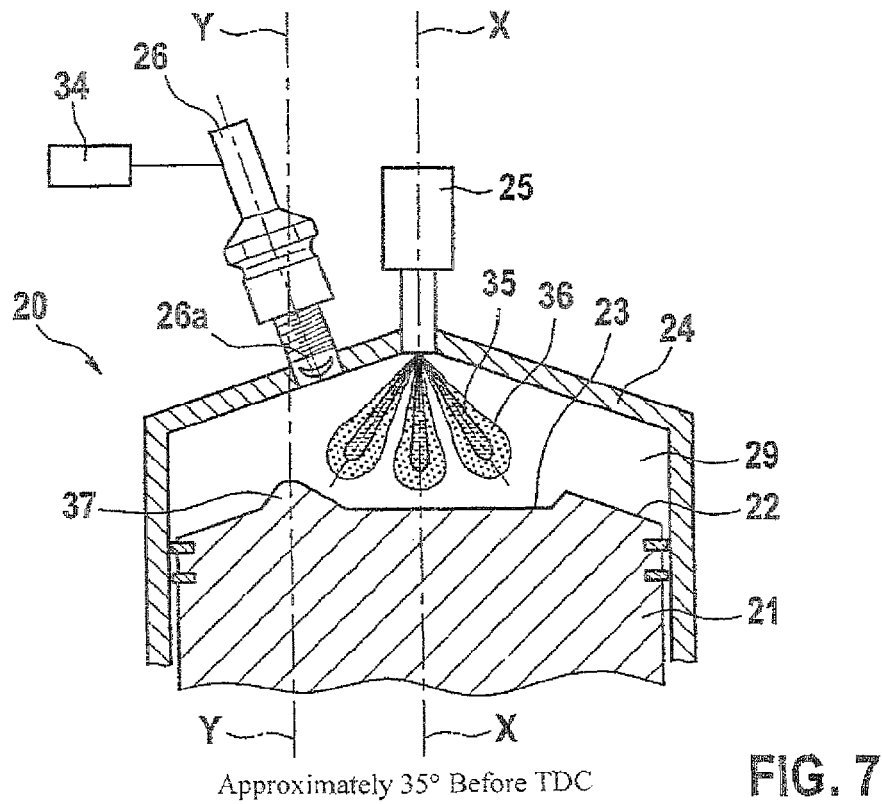
FIGS. 7 and 8 are schematic sectional views of an internal combustion engine in a third exemplary embodiment of the present invention.
Figure 8:
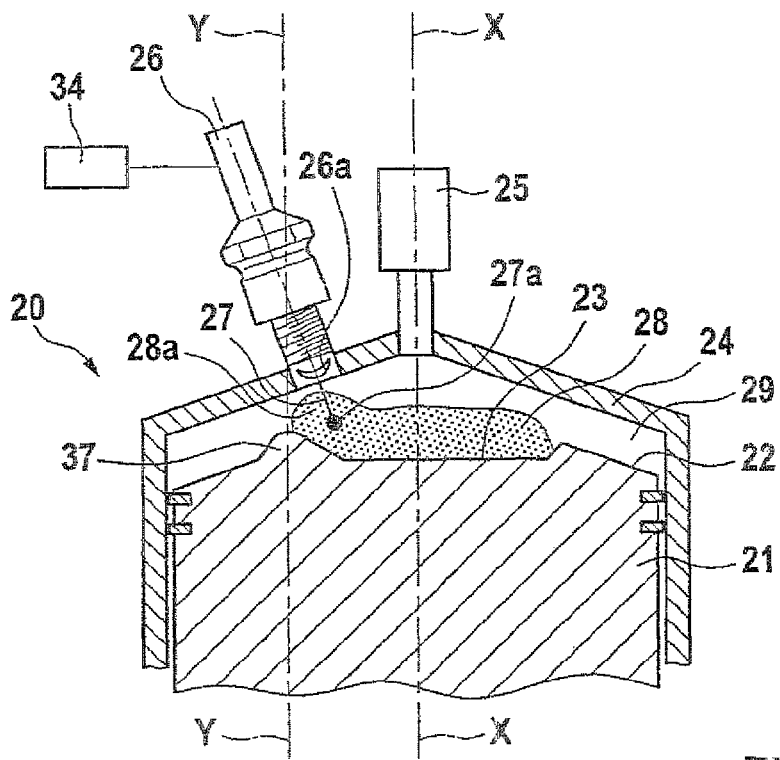

FIGS. 7 and 8 show an internal combustion engine 20 in a third exemplary embodiment of the invention, in which once again identical or functionally identical parts are identified by the same reference numerals as in the preceding exemplary embodiment. The engine 20 in the third exemplary embodiment is essentially equivalent to that of the second exemplary embodiment, except that the protruding nub 37 in the third exemplary embodiment is disposed at a periphery of the hollow 23. As a result, the injection device 25 can be disposed centrally on the center axis X-X of the piston 21, and the laser ignition device 26 is disposed in the cylinder head 24 in such a way that it is positioned above the protruding nub 37. As a result the nub 37 and the laser ignition device 26 are located essentially on a common axis Y-Y that is parallel to the center axis X-X. The injection of fuel is effected directly into the hollow 23 formed in the piston bottom 22. In cooperation with the hollow 23 and the motion of the piston 21 contrary to the incoming stream direction, the mixture region 28 is again formed in the hollow 23 after the end of injection and before the ignition, and the mixture region 28 has a protruding region 28a in the region of the protruding nub 27 (see FIG. 8). In a position approximately 20° before top dead center, which is shown in FIG. 8, the focal point of the laser 27 is located in the protruding region 28a of the mixture region 28, so that ignition can then take place in the interior of the mixture region 28. As a result, it is also possible, in comparison to the first exemplary embodiment, to enable earlier ignition of the mixture region 28, since the laser ignition device ignites the protruding region 28a of the mixture region 28, and the flame travels extend from there through the entire mixture region 28. Otherwise, this exemplary embodiment is equivalent to the preceding exemplary embodiments, so that the description of those may be referred to.

In FIGS. 9 and 10, an internal combustion engine 20 in a fourth exemplary embodiment of the invention is shown; once again, identical or functionally identical parts are identified by the same reference numerals as in the preceding exemplary embodiments. The fourth exemplary embodiment is essentially equivalent to the second exemplary embodiment; once again, a protruding nub 37 is formed centrally in the hollow 23 in the piston bottom 22. The laser ignition device 26 is again disposed centrally on the center axis X-X of the piston 21, and the injection device 25 is at an angle α. Unlike the second exemplary embodiment however, the piston bottom in the region of the hollow 23 is inclined relative to a plane E that is perpendicular to the center axis X-X. The inclination is indicated by the angle β in FIGS. 9 and 10. The inclination of the hollow 23 is preferably selected such that a central injection stream injects essentially perpendicular to the inclined surface of the hollow. The central injection stream strikes the protruding nub 37 in particular, which leads to faster formation of the patty-shaped mixture region 28. As can be seen from FIGS. 9 and 10, the laser ignition device 26 is again disposed above the protruding nub 37, so that early ignition of the mixture region is possible. Otherwise, this exemplary embodiment is equivalent to the preceding exemplary embodiments, so that the description of those may be referred to.

Figure 11:
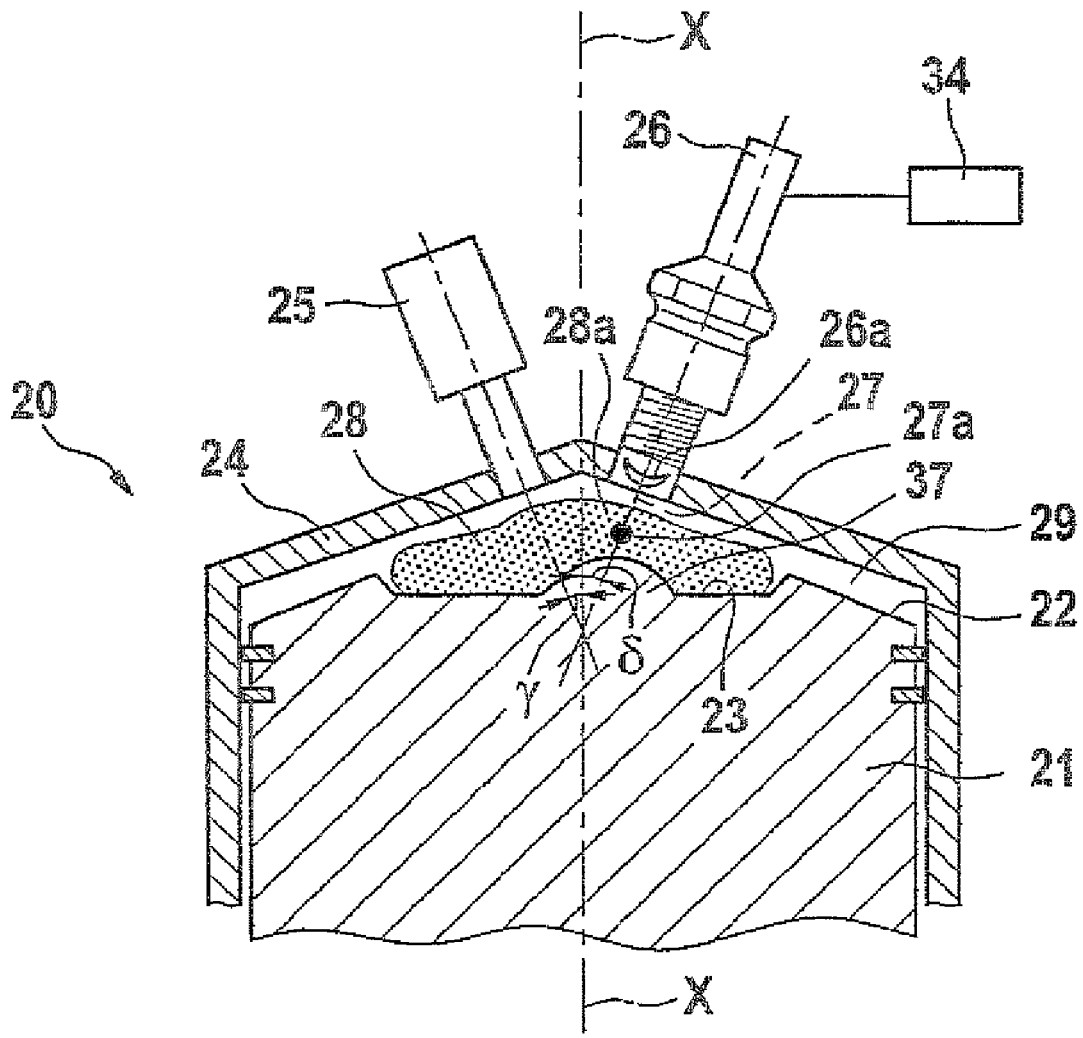
FIG. 11 is a schematic sectional view of an internal combustion engine in a fifth exemplary embodiment of the present invention.

FIG. 11 shows a fifth exemplary embodiment of an internal combustion engine of the invention; again, identical or functionally identical parts are identified with the same reference numerals as in the preceding exemplary embodiments. The fifth exemplary embodiment is essentially equivalent to the second exemplary embodiment; unlike the second exemplary embodiment, both the injection device 25 and the laser ignition device 26 are disposed at an angle γ and δ, respectively, to a center axis X-X. The angles of inclination γ, δ of the injection device 25 and laser ignition device 26 are the same and differ only in their sign. A protruding nub 37 in the hollow 23 in the piston bottom 22 is again located below the laser ignition device 26, resulting in an asymmetrical embodiment of the hollow. The patty-shaped mixture region 28 again forms with a protruding region 28a above the protruding nub 37, so that an ignition site 27a of the mixture region 28 is located in this protruding region 28a. Otherwise, this exemplary embodiment is equivalent to the preceding exemplary embodiment, and the description of that may be referred to.

Below, an internal combustion engine in a sixth exemplary embodiment of the invention will be described in conjunction with FIGS. 12 and 13; once again, parts that are identical or functionally identical are identified by the same reference numerals as in the preceding exemplary embodiments. The engine in the sixth exemplary embodiment has two laser ignition devices 26, as shown in FIG. 12. An injection device 25 is disposed centrally on a center axis X-X of the piston 21. The two laser ignition devices 26 are disposed laterally at an angle γ and δ, respectively, to the center axis X-X, and the angles γ and δ are the same size. The disposition of two laser ignition devices 26 makes it possible to generate two ignition sites 27a in the patty-shaped mixture region 28. As a result, in particular, the flame travels inside the mixture region 28 can be kept short. In FIGS. 12 and 13, the flame travels are schematically drawn as short arrows around the ignition sites 27a. Ignition of the patty-shaped mixture region 28 is preferably effected simultaneously, since the patty-shaped mixture region 28 is embodied symmetrically to the center axis X-X. The two ignition sites 27a are located on a plane F that is perpendicular to the center axis X-X. Otherwise, this exemplary embodiment is equivalent to the preceding exemplary embodiments, and the description of those may be referred to.

FIGS. 14a and 14b also show two different examples for igniting the patty-shaped mixture region 28 by means of a plurality of ignition sites. In FIG. 14a, there are three ignition sites 27a, disposed in a mixture region 28 of circular circumference at angles of approximately 120° each from one another, beginning at a center axis X-X. The spacings of each ignition site 27a to the periphery of the mixture region 28 are selected to be equal. In FIG. 14b, an embodiment with four ignition sites 27a is shown, which are disposed symmetrically to a center axis X-X. As can be seen from FIG. 14b, this disposition with four ignition sites 27a is especially advantageous, since the flame travels, beginning at each ignition site 27a, through the entire mixture region 28 are essentially of equal length, until the entire mixture region 28 is ignited.

It is noted that it is understood that in all the exemplary embodiments shown, multiple injection can be performed. This has the advantage in particular that the mixture region 28 is constructed in stratified fashion, with a thin layer of air between each two fuel-air mixture layers. As a result, the proportion of air in the mixture region 28 can be increased.

A further advantage of the method of the invention, in all the exemplary embodiments described, is that for generating the mixture region 28, injection devices can be used that generate symmetrical spray geometries (without a spray gap for the spark plug). As a result, it is also unnecessary to associate the injection device with a spark plug protruding into the combustion chamber. Moreover, moistening of the laser ignition device with liquid fuel, which in the prior art reduces the ignitability of a spark plug, does not occur.

An internal combustion engine according to the invention can be used both in vehicles and in stationary fashion.

The foregoing relates to the preferred exemplary embodiment of the invention, it being understood that other variants and embodiments thereof are possible within the spirit and scope of the invention, the latter being defined by the appended claims.

The invention claimed is:

1. A method for operating an internal combustion engine having a fuel injection device and a laser ignition device, comprising the step of:
   generating a laser beam by means of the laser ignition device and directing the laser beam into a combustion chamber;
   injecting fuel into the combustion chamber by means of the fuel injection device during a compression cycle of engine in a particular manner; and wherein the fuel is injected into the combustion chamber in such a way that
   forming an ignitable patty-shaped mixture region comprising fuel and air on the piston by injecting the fuel into the combustion chamber in the particular manner;
   elapsing a predetermined period of time between an end of the fuel injection and a beginning of an ignition, in order to form the patty-shaped mixture region; and
   effecting an ignition is in the interior of the patty-shaped mixture region by means of the laser ignition device.

2. The method according to claim 1, wherein the injection of the fuel is effected by means of a multi-port valve having a multiplicity of injection ports, or by means of an annular gap valve opening outward.

3. The method according to claim 1, wherein the period of time between the end of the fuel injection and the beginning of the ignition is equivalent to a time in which the piston moves over a crankshaft angle of from 5° to 15°, in particular from 5° to 10°, and in particular 7.5°.

4. The method according to claim 1, wherein a hollow is formed in the piston bottom of the piston, and the patty-shaped mixture region forms in the hollow.

5. The method according to claim 2, wherein the mixture region is ignited as close as possible to or at its center.

6. The method according to claim 2, wherein a protruding nub is formed on the piston, in order to form an axially protruding region in the patty-shaped mixture region.

7. The method according to claim 6, wherein an ignition of the mixture region is effected in the protruding region.

8. The method according to claim 1, wherein the fuel injection is effected in a plurality of intervals and/or with a plurality of injection devices.

9. The method according to claim 1, wherein the patty-shaped mixture region is ignited at a multiplicity of ignition sites in the interior of the mixture region.

10. The method according to claim 9, wherein the multiplicity of ignition sites is disposed symmetrically in the patty-shaped mixture region.

11. The method according to claim 1, wherein a focal length of the laser ignition device is variable.

12. The method according to claim 9, wherein ignition from a first and a second ignition site is effected at different instants.

13. The method according to claim 10, wherein ignition from a first and a second ignition site is effected at different instants.

14. The method according to claim 11, wherein ignition from a first and a second ignition site is effected at different instants.

15. The method according to claim 1, wherein the method is performed in a stratified-charge mode of the engine.

16. An internal combustion engine for direct injection of gasoline, comprising:
   a laser ignition device;
   a piston;
   a fuel injection device, which injects fuel into a combustion chamber in a compression cycle of the engine in such a way that an ignitable patty-shaped mixture region is created on the piston; and
   a control unit means, for determining an instant of ignition of the laser ignition device, wherein the control unit means determines the instant of ignition in such a way that the laser ignition device does not forward an ignition signal until a focal point of a laser beam of the laser ignition device is located in an interior of the mixture region.

17. The internal combustion engine according to claim 16, wherein the control unit means determines the instant of ignition as a function of a position of the piston.

18. The internal combustion engine according to claim 17, wherein the position of the piston can be determined by ascertaining a crankshaft angle.

19. The internal combustion engine according to claim 16, wherein the piston, on its piston bottom face, has a substantially circular hollow.

20. The internal combustion engine according to claim 16, wherein the piston, on its piston bottom face, has a protruding nub.

21. The internal combustion engine according to claim 19, wherein the hollow has a basic face that is inclined at an angle ($\beta$) relative to a center axis (X-X) of the piston.

22. The internal combustion engine according to claim 16, wherein the laser ignition device has a focusable lens, for varying a position of a focal point of the laser beam.

23. The internal combustion engine according to claim 16, further comprising a multiplicity of laser ignition devices.

24. The internal combustion engine according to claim 16, wherein the control unit means activates the multiplicity of laser ignition devices at different instants.

* * * * *